(12) United States Patent
McPherson

(10) Patent No.: US 9,483,064 B2
(45) Date of Patent: Nov. 1, 2016

(54) REMOTE CONTROLLABLE THERMOSTAT

(71) Applicant: Hunter Fan Company, Memphis, TN (US)

(72) Inventor: Jason Matthew McPherson, Memphis, TN (US)

(73) Assignee: Hunter Fan Company, Memphis, TN (US)

( * ) Notice: Subject to any disclaimer, the term of this patent is extended or adjusted under 35 U.S.C. 154(b) by 505 days.

(21) Appl. No.: 13/961,681

(22) Filed: Aug. 7, 2013

(65) Prior Publication Data

US 2015/0045959 A1 Feb. 12, 2015

(51) Int. Cl.
| | | |
|---|---|---|
| G05B 11/01 | (2006.01) | |
| G05B 21/00 | (2006.01) | |
| G05B 13/00 | (2006.01) | |
| G05B 15/00 | (2006.01) | |
| G01M 1/38 | (2006.01) | |
| G05D 23/00 | (2006.01) | |
| G05D 23/19 | (2006.01) | |

(52) U.S. Cl.
CPC ...... *G05D 23/1951* (2013.01); *G05D 23/1905* (2013.01); *G05D 23/1917* (2013.01)

(58) Field of Classification Search
CPC ................ G05D 23/1951; G05D 23/1917
USPC .......................... 700/12, 276, 300
See application file for complete search history.

(56) References Cited

U.S. PATENT DOCUMENTS

| | | | | |
|---|---|---|---|---|
| 2007/0241203 A1* | 10/2007 | Wagner | ................ | F24F 11/0034 236/1 C |
| 2012/0179300 A1* | 7/2012 | Warren | ................ | F24F 11/0012 700/278 |
| 2013/0140016 A1* | 6/2013 | Storm | .................... | F24F 11/006 165/205 |
| 2013/0186964 A1* | 7/2013 | Simon | .................. | F24F 11/0012 236/51 |
| 2013/0297959 A1* | 11/2013 | Simon | ....................... | H02J 3/14 713/323 |
| 2013/0313331 A1* | 11/2013 | Warren | ................ | F24F 11/0012 236/1 C |
| 2014/0000858 A1* | 1/2014 | Frank | .................. | F24F 11/0012 165/201 |

* cited by examiner

*Primary Examiner* — Ronald Hartman, Jr.
(74) *Attorney, Agent, or Firm* — McGarry Bair PC

(57) ABSTRACT

A remote controllable thermostat has an on-board power supply with batteries, a microcontroller having a timer, a temperature sensor, a temperature set point control controller and an RF receiver. The thermostat also has HVAC state control means for generating HVAC control signals in response to sensed temperatures being outside of control set point range and for periodically connecting and disconnecting the RF receiver from the power source to conserve battery power. Where the thermostat has user mode selector switches, the microcontroller is further programmed to read their state only periodically for additional battery power conversation.

6 Claims, 6 Drawing Sheets

REMOTE CONTROLLABLE THERMOSTAT

TECHNICAL FIELD

This invention relates to remote controllable thermostats and more specifically to wirelessly controllable thermostats that employ a battery or batteries as an onboard power source.

BACKGROUND OF THE INVENTION

Thermostats have long been used to control heating, ventilation, and air conditioned systems which are referred to as HVACs. More recently thermostats have been devised that may be remotely controlled by radio or infrared signals. They offer a number of advantages over those which are manually controlled as with a keypad due to the prevalence today of wireless communications such as those via the internet.

For example, remote controllable thermostats may be used to shut off a building air condition system should one have forgotten to do so before leaving. One can instruct the thermostat to postpone cooling or heating of ones home because of one's anticipated tardiness. They can also be used to monitor a building's temperature in case the air conditioner should fails or another occupant should change its program. Though radio communications with the thermostat may be established by several means, as previously stated, a popular method today is to control it via the internet through the use of an RF communications protocols such as WiFi. Representative prior art patent disclosures of this technology include U.S. Pat. Nos. 6,394,359, 7,571,865 and 8,276,829, amongst others. A problem with such wireless communications is that they require more power to operate the thermostat, thus greatly reducing the life of the battery. As such, not only does the hardware need to be as low power as possible in order to conserve the battery life, but the radio communications must be optimized in order to reduce unnecessary radio traffic. In particular, the radio should transmit at a minimal level and the radio receive time must also be at a minimal level.

Thermostats can be powered by dc batteries or by ac line power via in-place field wiring. Even so, on-board battery power is highly desirable as connections with the HVAC are often not in place in the field wiring. This in turn mandates that they operate in a low power mode to conserve battery energy. The integrated circuit (IC) devices, the display units, and the HVAC mode control logic are thus usually designed to operate under 200 uA so that they may be powered by inexpensive, small alkaline batteries with a life time of up to a year as opposed to larger capacity and more costly lithium ion batteries.

In many situations the thermostat is powered from both an onboard dc power source and/or an ac power source, namely by direct municipal line power or off the HVAC system. Even where ac power is available it is important for the unit itself to have standby dc power available as backup in the event of an ac power outage from the local power company or from a circuit breaker having been tripped. In such event it is desirable to have all batteries disconnected when the unit is operating on ac power to avoid battery discharge.

Another battery drainage source has been that of mode switch monitoring. More advanced and expensive dry contact switches have a low on resistance of the switch which requires a minimum wetting current.

It thus is seen that numerous requirements of sophisticated or smart, modern day, remote control thermostats place direct power drains on onboard battery power supplies as well as leakage during their quiescent operations. Accordingly, it is a principal object of this invention to minimize such in order to enable the onboard power source to be provided by one or more low voltage, low cost, dry cell batteries such as alkaline and yet with a substantial life span to minimize replacements. It is to the provision of such that this invention is primarily directed.

SUMMARY OF THE INVENTION

In one preferred form of the invention a remote controllable thermostat has an on-board power supply which has at least one battery, a microcontroller (microprocessor) having timing means, temperature sensing means, means for setting temperature control set points and a radio with RF receiver means. It also has HVAC state control means for generating HVAC control signals in response to sensed temperatures being outside of control set point ranges and for connecting and disconnecting the RF receiver means from the power supply in response to its entering and leaving its quiescent state within the control set point range to conserve power. Where the thermostat has user operational mode selector switches, the microcontroller is programmed to read their state only periodically for additional power conservation.

In another preferred form of the invention, a method of operating a remote controllable, battery operative thermostat comprises the steps of (A) providing a thermostat with an on board power supply which has at least one battery, a microcontroller having timing means, temperature sensing means, means for setting temperature control set points, a wireless communication device coupled to the microcontroller, HVAC state control means coupled to the microcontroller, and control means for controlling the operation of the wireless communication device; (B) activating the wireless communication device according to a sleep mode polling time associated with a periodic schedule to contact a remote server and determine if a change message is waiting to be received by the thermostat from the server; and (C) on the condition that a message is waiting to be downloaded, subsequently downloading the message from the server to the thermostat and updating the means for setting temperature control set points if the message pertains to a change in the temperature control set points.

DETAILED DESCRIPTION

Low voltage thermostats can be powered by batteries or by the HVAC system via the field wiring. Inclusion of onboard batteries is highly desirable because some HVAC systems are not configured to provide them with power or, more commonly, connections from the HVAC systems are not present in the field wiring. Conventional thermostats have overcome this limitation in available field power by having the capacity of operating in a low power mode. Their IC devices, displays and HVAC mode control logic are typically configured to operate under 200 uA with dry cell, alkaline batteries for up to a year.

Connected thermostats are designed to be monitored and controlled either manually or remotely. Their inclusion of RF transmitters and receivers however add to power demand which reduces battery life from a year to a few months. The radio technologies commonly used, such as 802.11 WiFi, requires high current during transmissions and, more importantly, high stand-by current. Practically they need either field power or high capacity batteries such as lithium ion which are costly and yet, with the prevalence today of remote monitoring and control, as by mobile telephone or via the internet, connected thermostats are in demand.

Figure 1:
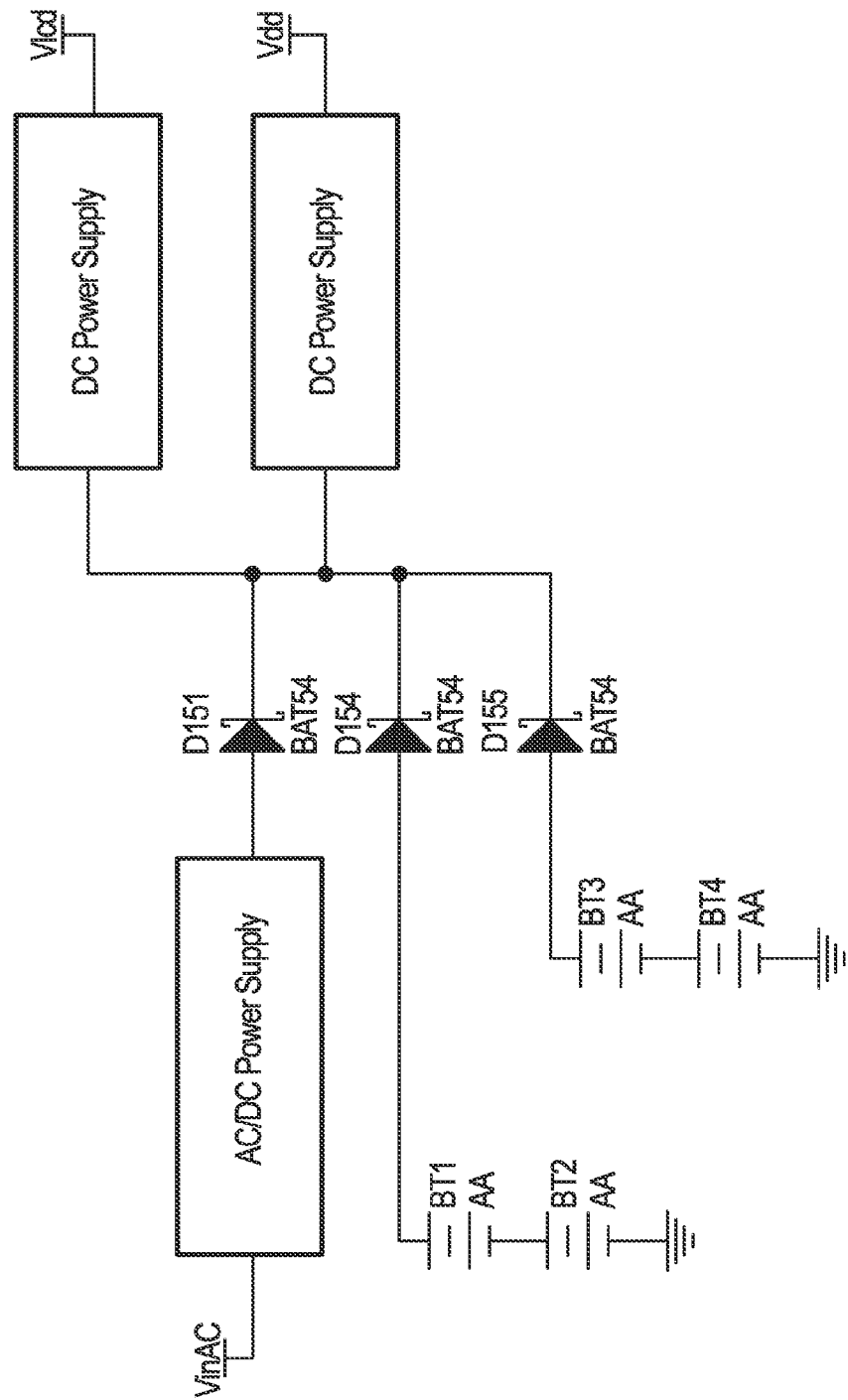
FIG. 1 is a block diagram of HVAC thermostat having an AC power supply plus two onboard DC power supplies that may utilize the novel DC power conservation protocol of the present invention.

FIG. 1 illustrates a thermostat with both AC and onboard DC power supplies. In this case where AC power is made available the thermostat may auto-configure itself into a constant hyper-polling mode. This provides the lowest latency while AC power is present. Here it is seen that the thermostat may be powered by AC power alone, battery power alone (battery 14), or by both. The DC power supplies auto-configure to boost voltages as the batteries drain but only when necessary to reduce their bias currents.

Figure 2:
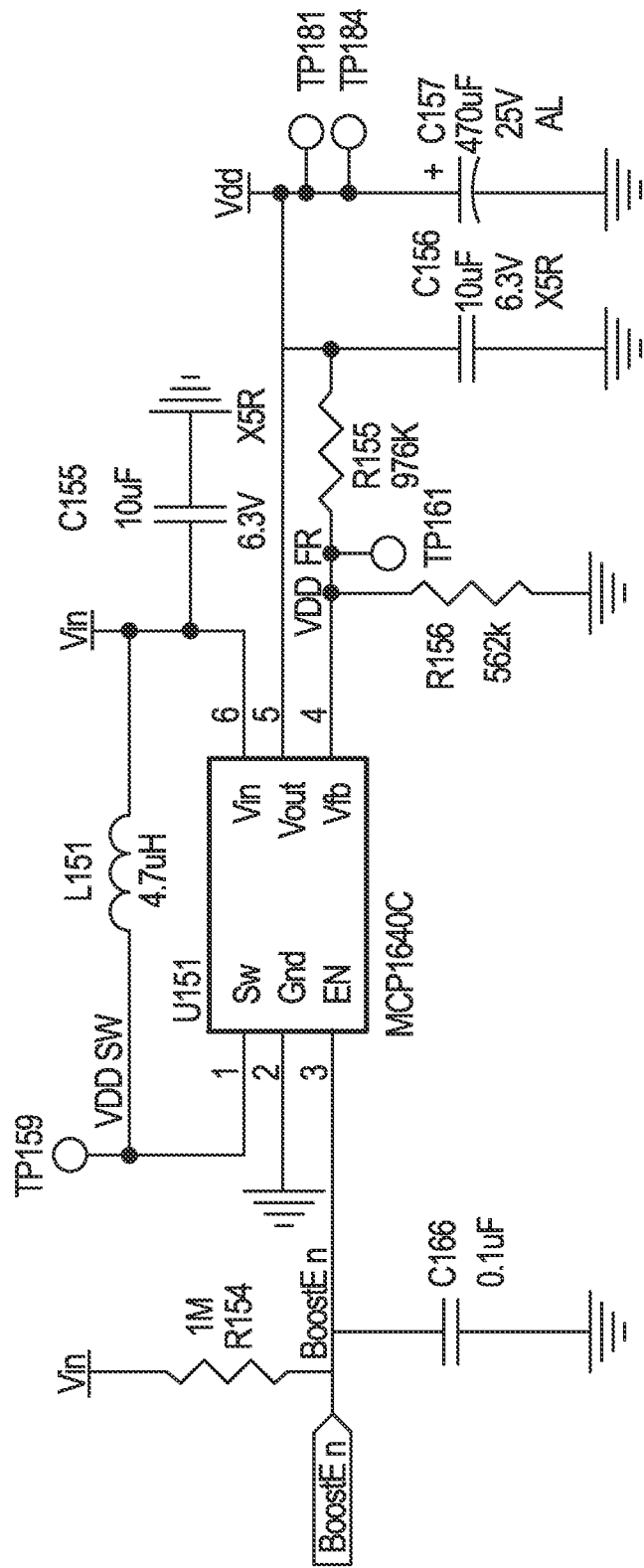
FIG. 2 is a schematic diagram of boost regulator circuit that may be used in a thermostat embodying principles of the invention.

FIG. 2 illustrates a circuit that may be employed for such boosting of potential where power in is through Vin and power out is through Vdd. Here Vdd is equal to Vfb times the sum of R155 plus R156, divided by R156, where Vfb is the internal voltage of the regulator.

The BoostEn signal is controlled by the onboard microcontroller or microprocessor. The default state of the signal is high impedance which through pull-up R154 places the regulator in boost mode. In boost mode the input voltage at Vin is boosted to the desired output voltage Vdd. Where Vin is equal to or above the desired Vdd, the BoostEn can be de-asserted by driving that signal low. This allows Vin to pass through to Vdd through the internal regulator switch. This mode is desired when the circuit needs to be in a very low power state. With the regulator in its boost mode, regulator current flowing to ground through pin 2 is at the lowest value. Capacitors C166, C155 and C156 provide filtering while capacitor C157 provides energy storage to provide current to the load.

Figure 3:
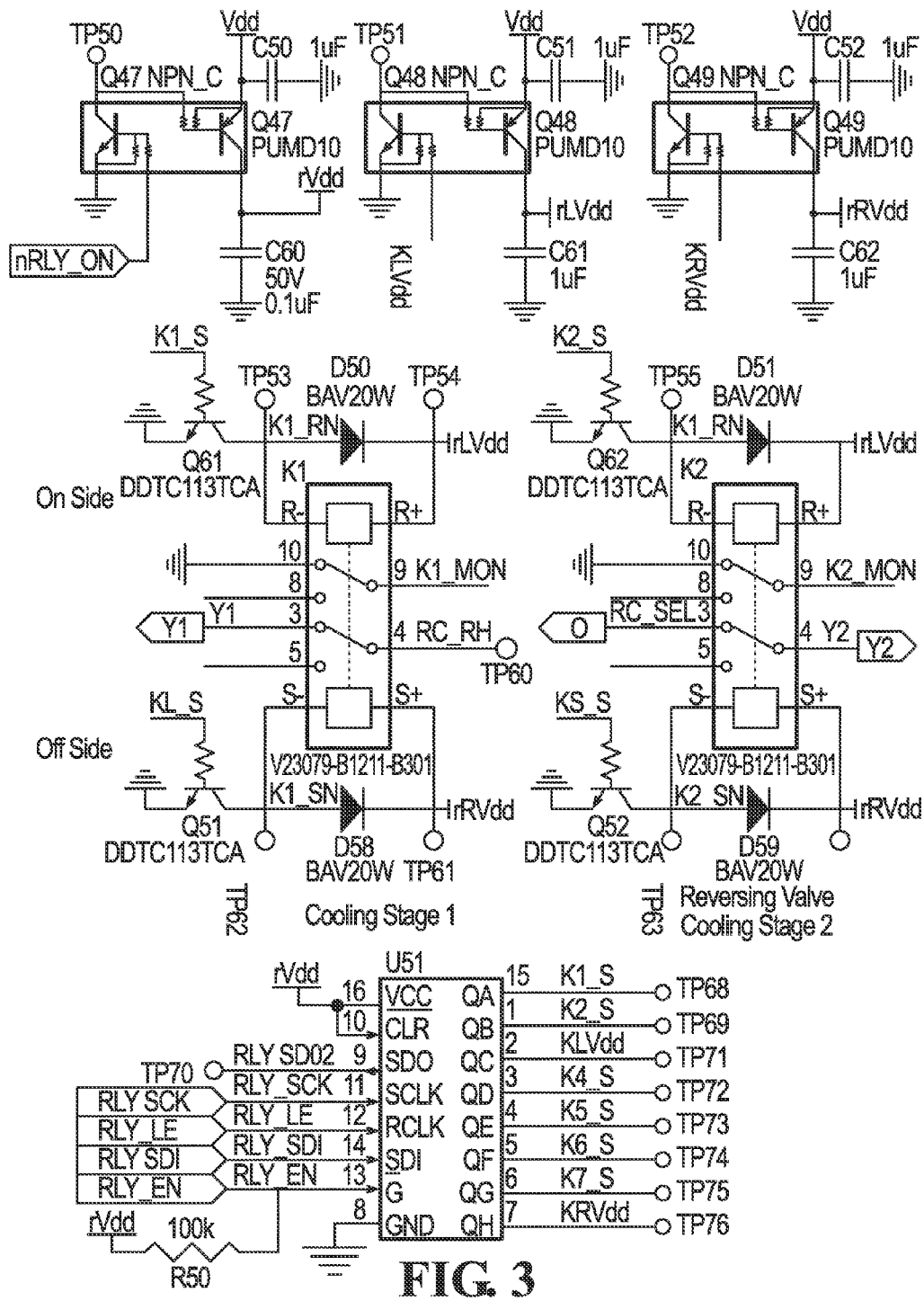
FIG. 3 illustrates HVAC state control circuitry that is optimized for low power operation in which the present invention may be utilized.

The HVAC preferred state control circuitry for low power operation is shown in FIG. 3. The HVAC state changes where the sensed temperature changes relative to the programmed set-point programmed range. When this occurs one or more relays are activated to change the HVAC system to its proper state. While not changing states both the high side power and the low side power side is switched off to prevent the state control circuitry from consuming power. Thus, no leakage paths exist while the circuit is in its quiescent state.

Here it is seen that two relays are controlled through only five control pins, although more may be utilized. The control lines are connected to the onboard microcontroller. The pins shown are as follows.

| nRLY | ON | Master power switch |
| RLY | SCK | Serial peripheral interface clock |

-continued

| RLY | LE | Latch enable |
| RLY | SDI | Serial peripheral data input |
| RLY | EN | Output enable |

To enable the output relay state the microcontroller applies an active high signal to nRLY ON. This turns on NPN/PNP transistors in Q47 thus applying power from Vdd to rVdd. The shift register in U51 receives power but the output latches are disabled due to the default state of RLY En signal being disabled through resistor R50. To change the output relay state three writes are made through the shift register. The first enables relay coil power through rLVdd or rRVdd. Only one side is set. The second write enable the coil transistor KxS where x is the relay channel number. The third write clears and disables the output latches. The relative time between the second and third write should be long enough for the relay set/reset time which is typically 4 to 5 milli-seconds.

The relay here is a bi-stable, dual coil 2 form C type. The bi-stable configuration allows the contact positions to be set or reset under power, then contact power can be removed without relying on a constant power drain to maintain relay state. Again, power is applied to the high side of the relay coil, e.g. rLVdd or rRVdd and then the corresponding relay channel is activated. Power is removed once minimum set/reset time is achieved. The output relay state is latched into the individual relays while consuming no power. A signal from U51 pin9 (RLY SDO2) is sent to the microprocessor for verification of the shift register state.

Figure 4:
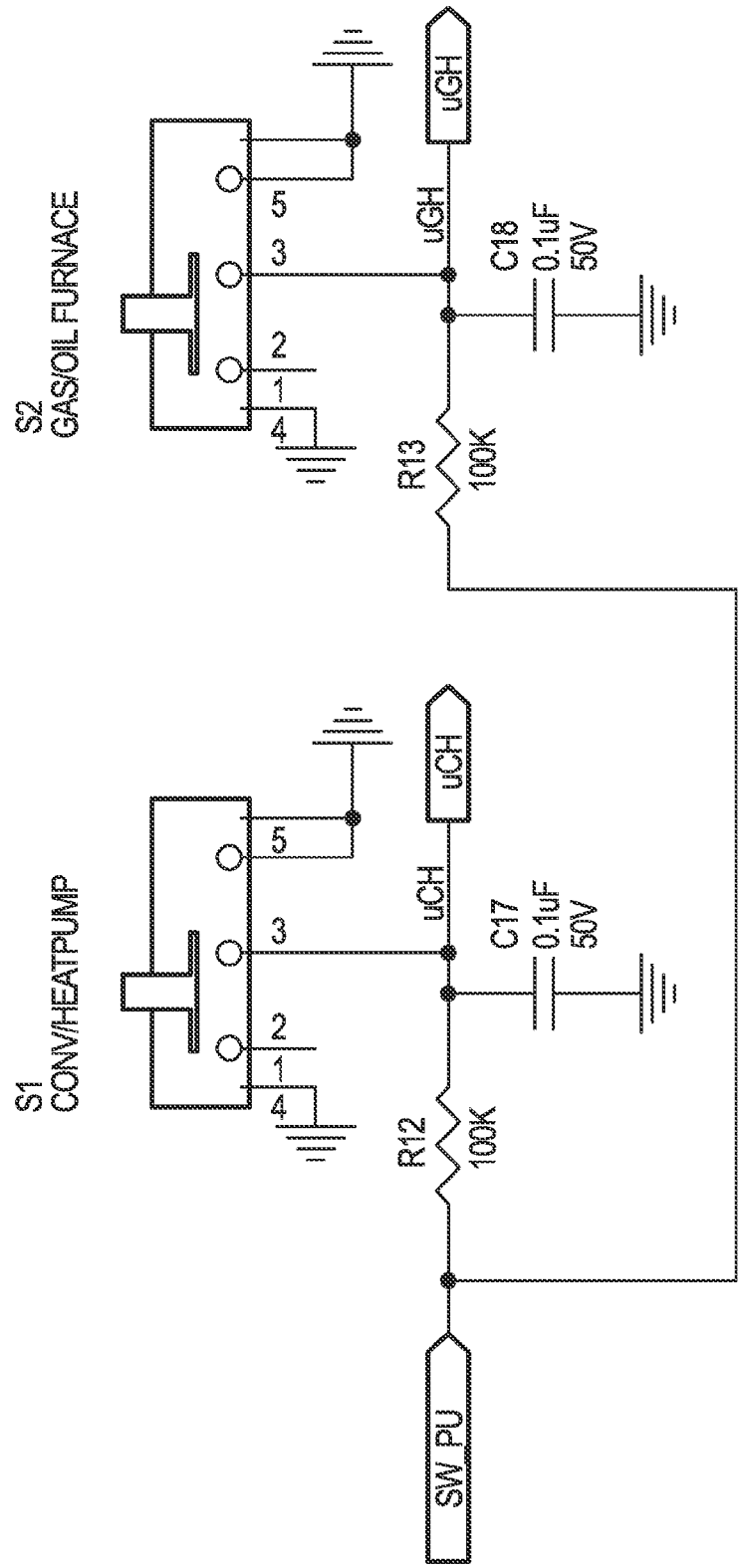
FIG. 4 is a schematic diagram of a low power mode controller for the thermostat.

FIG. 4 shows that the low power mode controller has user configurable mode switches whose state read wetting current could provide a continuous source of leakage. To prevent this, the microcontroller is programmed to remove quiescent current with node SW PU being connected to it. The default state of this pin is high impedance. As there is no power used by the circuit, there is no quiescent power consumed.

Another advantage of this mode control topology lays in the mode switch selection criteria. Advanced, and more expensive, dry contact switches have a low on resistance of the switch with a minimum wetting current required. The wetting current is that required through the switch in its ON position to guarantee minimum read-on resistance.

In the FIG. 4 circuit the minimum wetting current is 30 micro-amps which results in a maximum on-resistance of 1 ohm. Thus, R12 should be 100 kilo-ohms or less. Conversely, with conventional topology this would result in an average quiescent current draw of 66 micro-amps. Use of the circuit of this figure however reduces quiescent current linearly by the sample rate of the switches. Where a switch is read only every 30 seconds, and the sample read is 10 msec, the average quiescent current draw is but a mere 22 nanoamps, orders of magnitude less than conventional.

Figure 5:
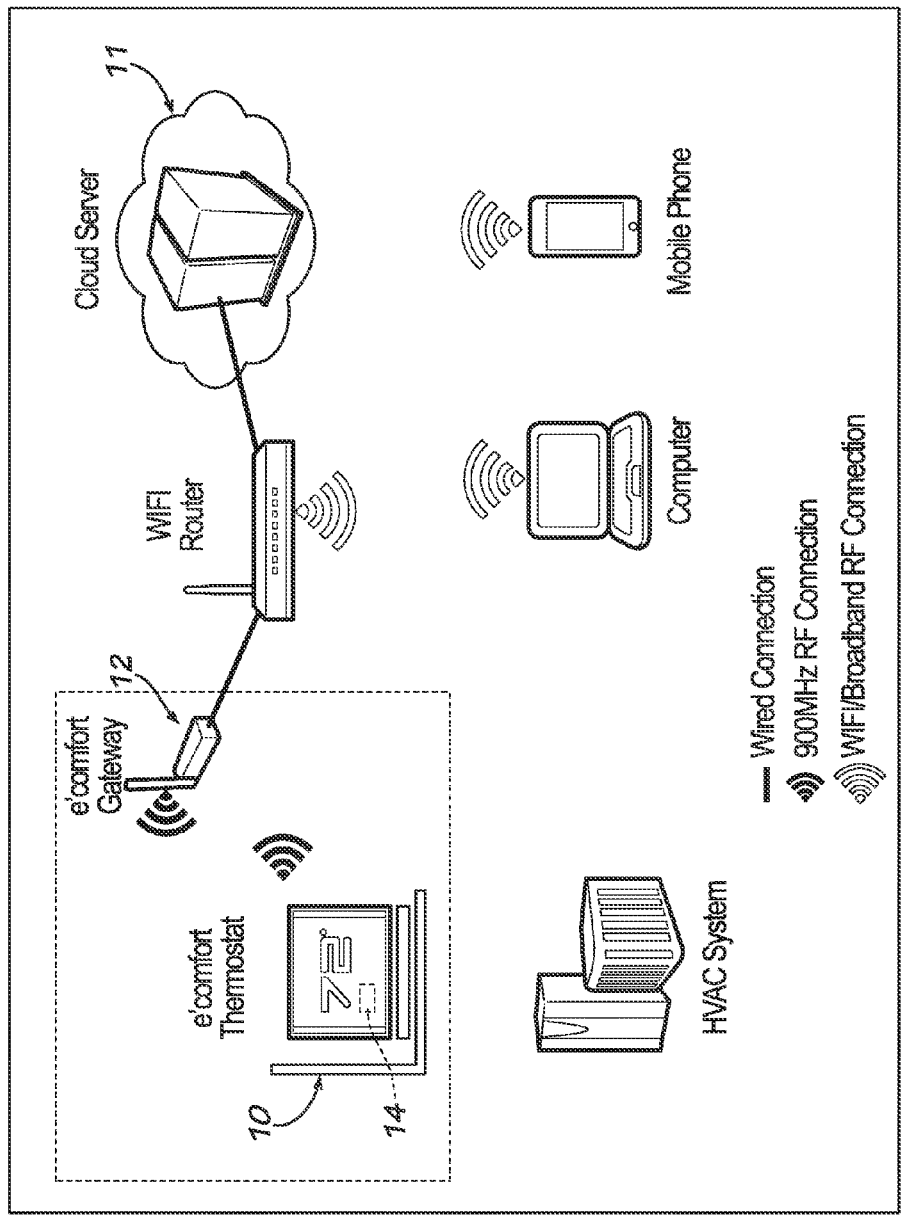
FIG. 5 is a schematic diagram of the thermostat and complete HVAC system of the present invention.

As shown in FIG. 5, the thermostat(s) 10 communicate to the cloud server 11 via a gateway 12. This gateway 12 is offline powered and therefore the power it consumes is not derived from the thermostat and is therefore not a concern with reference to such. A protocol is established between the radio (or other wireless communication device) on the thermostat 10 and the gateway 12 such that the thermostat will send it periodic heartbeats or signals (a period schedule of signals). The heartbeat communicate to the gateway 12 how long a period of time the radio will be in a deep sleep mode. This prevents the thermostat from having to synchronously communicate to the gateway, thus forcing it to stay awake for a longer period of time.

When a message is required to be sent to the (cloud) server 11, the thermostat 10 is capable of sending the message asynchronously. Thus, no extra power is consumed in the "asynchronous transmit model".

When a message is required to be sent from the cloud server 11 to the thermostat 10, the message is 'cached' on the server 11. The gateway 12 is notified that a data, data pack, or data set is available for the thermostat. On the next heartbeat, the gateway 12 notifies the thermostat that data exists on the server whereby it can be retrieved by the thermostat and the thermostat wakes up. This "mailbox method" allows the thermostat to remain in deep sleep as long as no data is available or ready from the server.

The heartbeat transactions can occur at any interval to allow a longer sleeping time resulting in a lower power consumption of the thermostat. The latency allowed in the data transaction determines how long the intervals can exist before a noticeable delay is observed.

Figure 6:
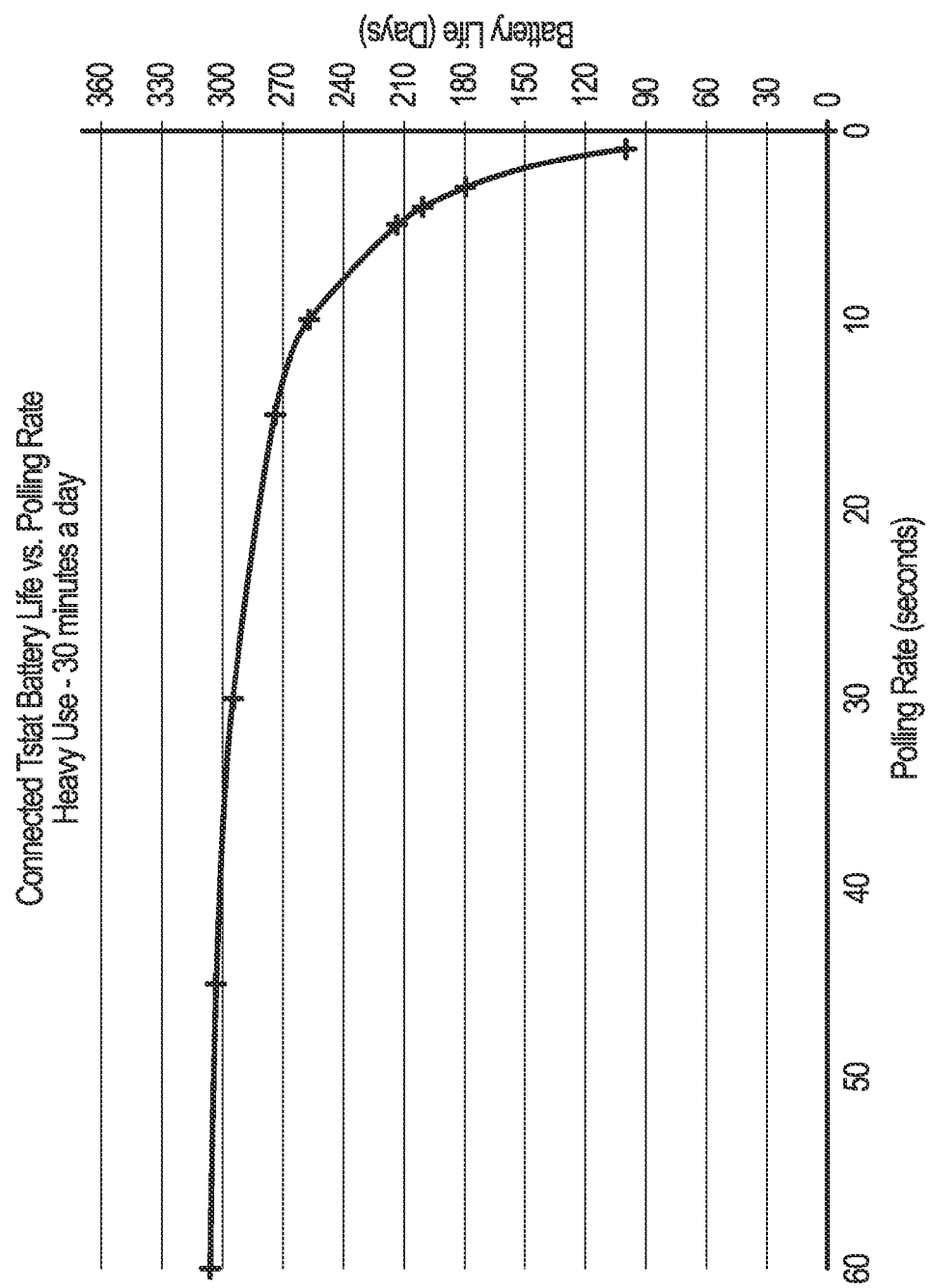
FIG. 6 is a graph illustrating the polling rate versus the battery life associated with the thermostat.

As shown in the FIG. 6, as the polling rate increases (shorter time between polls of the period schedule) the battery life of battery 14 consequentially decreases. The sharp decrease as the polling rate approaches zero shows the effectiveness of the sleep interval on the overall power consumption of the system.

The chart diagram is modeled for heavy data and HVAC use. The results show the effect of a customer interacting with the thermostat for 30 minutes a day throughout the battery cycle.

As FIG. 6 shows, the polling rate can be arbitrarily set large in order to conserve power. The side effect of this is increasing the latency on the data exchange from the cloud server 11 to the thermostat 10. These transactions are typically when a person is trying to 'login' in to the thermostat in order to verify a set-point or in order to change a set-point on the thermostat 10. Typically, multiple interactions are usually performed in the same session with the thermostat.

For example, the system works by having the gateway 12 continuously communicate to the servers and once the server pushes a change to gateway it is held until the thermostat wakes itself up. The thermostat sleeps for 59 plus seconds out of the minute (sleep mode polling time), wakes up for a few milliseconds, polls the gateway for a change, and if a change has taken place wakes up. At this point the thermostat changes its polling rate from 60 seconds to 400 milliseconds (awake mode polling time), thus allowing for "real time" connectivity and the avoidance of the latency problem. After a period of 2 minutes has lapsed without a change the thermostat returns to the 60 second polling rate (sleep mode polling time) to allow the thermostat to remain in the sleep mode as much as possible.

In order to reduce the overall delays between multiple, consecutive interactions with the thermostat a new mode may also be employed, referred herein as "hyper-polling". With hyper-polling, the thermostat is normally in the long-sleep mode described above. When there is a data exchange from the cloud server 11, the thermostat 10 will remain in an active (high power) state for a short time period while awaiting further transactions. This online session can be left open until the data is no longer being received by the cloud server 11. Thereafter, the thermostat 10 goes back to the default polling rate and deep sleep modes (low power, passive, quiescent state). The battery life chart shown in FIG. 6 includes the result of 30 minutes of online activity a day.

The hyper-polling process provides a dynamic interaction between the user and the device such that the thermostat 10 is in deep sleep mode when not being used, but also provides a more real-time experience when the user is interacting with the thermostat.

As previously described, the thermostat 10 may be able to be powered from the HVAC system if all of the conditions are met. The presence of the HVAC system provides the thermostat the power necessary to auto-configure itself into a constant hyper-polling mode. This provides the lowest latency whenever abundant power is available. The thermostat can be powered by either ac power only, dc battery power only, or ac or dc battery power simultaneously. Each power source is monitored for health, and the communications mode is tailored appropriately to maintain optimal performance while conserving power.

The dc battery power supplies are also low power to conserve battery life. The dc battery power supplies auto-configure to boost the voltages as the batteries drain to increase the effective capacity of the batteries. If the boost is not required, the unregulated battery power is switched to the system unregulated to reduce the bias currents in the power supplies.

In addition, the dc battery power supplies can be selectively turned on/off to provide a deep-sleep mode of operation. In the case where some loads are only used occasionally (e.g., LCD Backlight), the entire subsystem is shutdown to provide the lowest quiescent current possible.

It thus is seen that a remote controllable thermostat is now provided that may be operated solely by onboard, low cost batteries such as dry cell alkaline ones that consumes little power for substantially expanded battery life time. In achieving this, its microcontroller is programmed to disconnect its radio receiver for substantial periods of time. The microcontroller may be further programmed to read user mode selection switches only periodically for additional battery power conservation.

While the thermostat has been shown and described in its preferred form and operation, it should be understood that many modifications, additions and deletions may be made thereto without departure from the spirit and scope of the invention as set forth in the following claims.

The invention claimed is:

1. A remote controllable, battery operative thermostat comprising an on-board power supply, a microcontroller having timing means including time based set points, temperature sensing means for setting temperature control set points, a radio with RF receiver means connected to the microcontroller, said RF receiver means periodically controlling said radio between a high powered, active state and a low powered, passive, quiescent state, and HVAC state control means connected to the microcontroller for generating HVAC control signals in response to sensed temperatures being outside of control set point ranges or in response to changed control states, wherein the quiescent state is determined by a periodic schedule and wherein said periodic schedule is changed as a result of contact being established between an external source and the thermostat.

2. The remote controllable, battery operative thermostat of claim 1 wherein the thermostat periodic schedule is temporarily changed to a shortened awake mode polling time to allow more fluid communication between the user and the thermostat.

3. The remote controllable, battery operative thermostat of claim 2 wherein after a period of non-activity is sensed by the thermostat the thermostat returns to a sleep mode polling time.

4. The remote controllable, battery operated thermostat of claim 1 wherein the thermostat periodic schedule is temporarily changed to a shortened awake mode polling time to allow more fluid communication between the user and the thermostat.

5. A remote controllable, battery operated thermostat comprising:
- an on-board power supply having at least one battery;
- a microcontroller including a timer with time based set points;
- a temperature sensor including temperature control set points;
- a radio with a RF receiver connected to the microcontroller, with the RF receiver periodically controlling the radio between a high powered, active state and a low powered, passive, quiescent state; and
- a HVAC state controller connected to the microcontroller for generating HVAC control signals in response to temperatures sensed by the temperature sensor outside of the temperature control set points or in response to changed control states;
- wherein the quiescent state is determined by a periodic schedule, which is changed as a result of contact being established between an external source and the thermostat.

6. The remote controllable, battery operated thermostat of claim 5 wherein after a period of non-activity is sensed by the thermostat, the thermostat returns to a sleep mode polling time.

* * * * *